(12) United States Patent (10) Patent No.: US 11,284,294 B2
Suzuki (45) Date of Patent: Mar. 22, 2022

(54) COMMUNICATION APPARATUS, TRAFFIC CONTROL METHOD, NON-TRANSITORY COMPUTER READABLE MEDIUM STORING CONTROL PROGRAM, AND CONTROL APPARATUS

(71) Applicant: NEC Corporation, Tokyo (JP)

(72) Inventor: Motohiro Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 16/961,841

(22) PCT Filed: Oct. 11, 2018

(86) PCT No.: PCT/JP2018/037902
§ 371 (c)(1),
(2) Date: Jul. 13, 2020

(87) PCT Pub. No.: WO2019/142413
PCT Pub. Date: Jul. 25, 2019

(65) Prior Publication Data
US 2020/0351706 A1 Nov. 5, 2020

(30) Foreign Application Priority Data
Jan. 18, 2018 (JP) .............................. JP2018-006442

(51) Int. Cl.
*H04W 28/02* (2009.01)
(52) U.S. Cl.
CPC ... *H04W 28/0289* (2013.01); *H04W 28/0284* (2013.01)
(58) Field of Classification Search
CPC ....... H04L 51/046; H04L 67/02; H04L 67/10; H04L 67/2838; H04L 65/4084;
(Continued)

(56) References Cited

U.S. PATENT DOCUMENTS

2010/0331001 A1 12/2010 Cai
2018/0316623 A1* 11/2018 Chen ................... H04L 65/4084
(Continued)

FOREIGN PATENT DOCUMENTS

JP 2007-265165 A 10/2007
JP 2012-531811 A 12/2012
(Continued)

OTHER PUBLICATIONS

International Search Report for PCT Application No. PCT/JP2018/037902, dated Jan. 8, 2019.
(Continued)

*Primary Examiner* — Asad M Nawaz
*Assistant Examiner* — Najeeb Ansari
(74) *Attorney, Agent, or Firm* — Sughrue Mion, PLLC

(57) ABSTRACT

A determination unit of a communication apparatus determines whether or not there has been a change of trend in the communication volume. This determination is performed based on a communication volume per session of a plurality of non-management access destination sessions in a first unit period, and a transition trend of a communication volume per session of a plurality of non-management access destination sessions in a first period. A specifying unit specifies, when it is determined that there has been a change of trend in the communication volume, an access destination that is newly set as a traffic control target access destination among a plurality of non-management access destinations that correspond to the plurality of respective non-management access destination sessions. This specification is performed based on increase rates of the communication volumes for the respective non-management access destination sessions in the first unit period and a second period.

11 Claims, 11 Drawing Sheets

(58) Field of Classification Search
CPC .................. H04L 67/06; H04L 67/32; H04W 28/02–0294; H04W 28/0284; H04W 28/0289
See application file for complete search history.

(56) References Cited

U.S. PATENT DOCUMENTS

2018/0337900 A1    11/2018  Uki
2019/0182712 A1*    6/2019  Watanabe ............. H04L 47/805

FOREIGN PATENT DOCUMENTS

JP      2015-530766 A    10/2015
WO     2017/098722 A1    6/2017

OTHER PUBLICATIONS

"Considerations and Best Practices for Zero-Rated Fraud Prevention" An Industry Whitepaper, 2016, Sandvine Intelligent Broaband Networks, Canada (https://www.sandvine.com/downloads/general/whitepapers/considerations-and-best-practices-for-zero-rated-fraud-prevention.pdf).

* cited by examiner

| TRAFFIC CONTROL TARGET ACCESS DESTINATION | TRAFFIC CONTROL NON-TARGET ACCESS DESTINATION |
|---|---|
| DOMAIN A | DOMAIN X |
| DOMAIN B | DOMAIN Y |
| ... | ... |
| | |

Fig. 5

```
mo01,,0901,12000000,12000000,12000000,12000000,12000000,,00000000,,,,,,00
00000000000000001_000001,1.1.1.1,11111,2.2.2.2,22222,3.3.3.3,80,00000000000000000000000000,,100.
1000,100,1000,8074,17386,6292,15647 ,0,0,0,0,off_on_off_on_off_off_on,None,200,200,,0,,,,,,,
,iPhone,text/html,,GET http://www.yahoo.co.jp/ HTTP/1.1,,,,,,,,
mo01,,0901,12000000,12000000,12000000,12000000,12000000,,00000000,,,,,,00
00000000000000001_000001,1.1.1.1,11111,2.2.2.2,22222,3.3.3.3,80,00000000000000000000000000,,100.
1000,100,1000,8074,15803,6292,15803,0,0,0,0,off_on_on_off_on_off__off_on,Img-
1200#00000,,,,4        ,,,,,49.9810046,1714193,189385,051,,iPad,image/png,,GET    http://www.sample.com/
HTTP/1.1,,,,,,,
mo01,,0901,12000000,12000000,12000000,12000000,12000000,,00000000,,,,,,00
00000000000000001_000001,1.1.1.1,11111,2.2.2.2,22222,3.3.3.3,80,00000000000000000000000000,,100.
1000,100,1000,8074,23251,6292,23251,0,0,0,0,off_on_on_off_on_off_off_on,Img-
1200#00000,,,,2        ,,,,,58.926004,977724,9885048,051,,iPad,image/gif,,GET    http://www.sample.com/
HTTP/1.1,,,,,,,
```

Fig. 6

|  | FIRST INCREASE RATE | SECOND INCREASE RATE | THIRD INCREASE RATE | FOURTH INCREASE RATE |
|---|---|---|---|---|
| FIRST PLACE | DOMAIN D | DOMAIN C | DOMAIN J | DOMAIN C |
| SECOND PLACE | DOMAIN C | DOMAIN E | DOMAIN C | DOMAIN I |
| THIRD PLACE | DOMAIN E | DOMAIN H | DOMAIN K | DOMAIN H |
| FOURTH PLACE | DOMAIN F | DOMAIN I | DOMAIN F | DOMAIN K |
| FIFTH PLACE | DOMAIN G | DOMAIN G | DOMAIN D | DOMAIN E |

Fig. 10

COMMUNICATION APPARATUS, TRAFFIC CONTROL METHOD, NON-TRANSITORY COMPUTER READABLE MEDIUM STORING CONTROL PROGRAM, AND CONTROL APPARATUS

This application is a National Stage Entry of PCT/JP2018/037902 filed on Oct. 11, 2018, which claims priority from Japanese Patent Application 2018-006442 filed on Jan. 18, 2018, the contents of all of which are incorporated herein by reference, in their entirety.

TECHNICAL FIELD

The present disclosure relates to a communication apparatus, a traffic control method, and a control program.

BACKGROUND ART

A Mobile Virtual Network Operator (MVNO) has introduced a service for making popular network services such as YouTube (registered trademark) free of packet communication charges in order to increase the number of subscribers (e.g., Non-Patent Literature 1). This service is called a "count free service".

The Mobile Virtual Network Operator grasps a Server Name Indicator (SNI) of a network service, which is the count free service, in advance and identifies that a packet for an access destination (e.g., a domain) indicated by the SNI of the count free service is a non-charging target.

Incidentally, in the count free service, popular network services tend to be selected from a business perspective such as topicality. In the count free service, however, since a target service is free of the packet communication charge, there is a concern about a volume of the packet communication of the count free service being increased as the number of subscribers increases. This causes the cost to increase, which may have an adverse influence on the business of the Mobile Virtual Network Operator. For example, since the Mobile Virtual Network Operator leases a wireless line from a Mobile Network Operator (MNO), an increase in the volume of the packet communication of the count free service causes an increase in the amount of payment for the Mobile Network Operator. On the other hand, the Mobile Virtual Network Operator cannot earn an income according to the volume of the packet communication in the count free service. The cost for the Mobile Virtual Network Operator can be reduced by setting the domain of the count free service as a "traffic control target access destination" and reducing an amount of communication traffic to the traffic control target access destination. Traffic control techniques that reduce the amount of communication traffic include, for example, a paging technique.

CITATION LIST

Non-Patent Literature

[Non-Patent Literature 1] Considerations and Best Practices for Zero-Rated Fraud Prevention (https://www.sandvine.com/downloads/general/whitepapers/considerations-and-best-practices-for-zero-rated-fraud-prevention.pdf)

SUMMARY OF INVENTION

Technical Problem

However, the service provider may change or add the access destination without notifying the Mobile Virtual Network Operator of this change or addition in advance. Therefore, in the current state, it may be difficult for the Mobile Virtual Network Operator to rapidly and accurately specify and update the access destination that should be newly set as the traffic control target access destination. That is, in the current state, information regarding the access destination set in a network equipment is updated by an equipment vendor that delivers devices to the Mobile Network Operator. Therefore, it may take a long time for the Mobile Virtual Network Operator to grasp that the service provider has changed or added the access destination and for the equipment vendor to set information regarding the access destination in the network equipment.

An object of the present disclosure is to provide a communication apparatus, a traffic control method, and a control program capable of rapidly and accurately specifying an access destination that should be newly set as a traffic control target access destination.

Solution to Problem

A communication apparatus according to a first aspect includes: a storing unit configured to store a management table that holds a plurality of management access destinations including at least one traffic control target access destination and at least one traffic control non-target access destination; a communication relay unit configured to establish a session between an access source apparatus and an access destination of the access source apparatus and relay communication between the access source apparatus and the access destination; a traffic controller configured to execute traffic control on the communication between the access source apparatus and the access destination of the access source apparatus when the access destination of the access source apparatus is the traffic control target access destination held in the management table; a determination unit configured to determine whether or not there has been a change of trend in the communication volume based on a communication volume per session of a plurality of non-management access destination sessions established by the communication relay means in a first unit period and a transition trend of communication volume per session of a plurality of non-management access destination sessions in a first period including a plurality of unit periods prior to the first unit period each of the non-management access destination sessions being a session whose access destination is a non-management access destination that is not held in the management table; and a specifying unit configured to specify, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period.

A traffic control method according to a second aspect includes: establishing a session between an access source apparatus and an access destination of the access source apparatus to relay communication between the access source apparatus and the access destination, and executing, when the access destination of the access source apparatus is a traffic control target access destination held in a management table, traffic control on the communication between the access source apparatus and the access destination of the access source apparatus, the management table holding a plurality of management access destinations including at least one traffic control target access destination and at least one traffic control non-target access destination; determining whether or not there has been a change of trend in the communication volume based on a communication volume per session of a plurality of non-management access destination sessions established in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table; and specifying, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period.

A control program according to a third aspect causes a communication apparatus to execute the following processing of: establishing a session between an access source apparatus and an access destination of the access source apparatus to relay communication between the access source apparatus and the access destination, and executing, when the access destination of the access source apparatus is a traffic control target access destination held in a management table, traffic control on the communication between the access source apparatus and the access destination of the access source apparatus, the management table holding a plurality of management access destinations including at least one traffic control target access destination and at least one traffic control non-target access destination; determining whether or not there has been a change of trend in the communication volume based on a communication volume per session of a plurality of non-management access destination sessions established in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table; and specifying, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period.

Advantageous Effects of Invention

According to the present disclosure, it is possible to provide a communication apparatus, a traffic control method, and a control program capable of rapidly and accurately specifying an access destination that should be newly set as a traffic control target access destination.

BRIEF DESCRIPTION OF DRAWINGS

FIG. 5 is a diagram showing one example of a management table according to the second example embodiment;

FIG. 6 is a diagram showing one example of session information according to the second example embodiment;

FIG. 10 is a diagram showing one example of a ranking table in which non-management access destinations are ranked.

DESCRIPTION OF EMBODIMENTS

In the following description, with reference to the drawings, example embodiments will be described. In the example embodiments, the same and equivalent elements are denoted by the same reference symbols and overlapping descriptions will be omitted.

First Example Embodiment

<Outline of Communication System>

Figure 1:
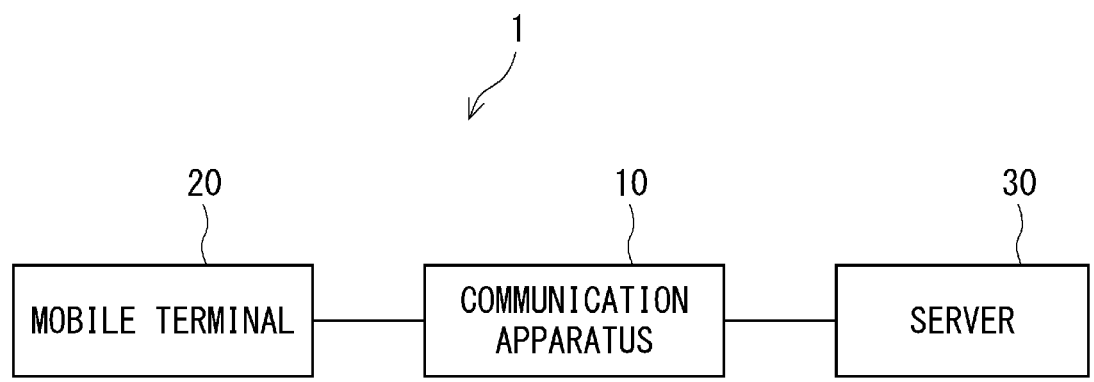
FIG. 1 is a block diagram showing one example of a communication system according to a first example embodiment.

FIG. 1 is a block diagram showing one example of a communication system according to a first example embodiment. In FIG. 1, a communication system 1 includes a communication apparatus 10, a mobile terminal 20, and a server 30.

When the communication apparatus 10 receives a session establishment request (i.e., an access request) from the mobile terminal 20 to the server 30, the communication apparatus 10 establishes a session between the mobile terminal 20 and the server 30. That is, the mobile terminal 20 is an "access source apparatus" and the server 30 or a domain to which the server 30 belongs is an "access destination". Then the communication apparatus 10 relays communication between the mobile terminal 20 and the server 30.

Further, the communication apparatus 10 stores a "management table" that holds a plurality of "management access destinations" including at least one "traffic control target access destination" and at least one "traffic control non-target access destination". The "traffic control target access destination", which is an access destination in which the volume of data communication may become equal to or larger than an "allowable reference value", is, for example, an access destination that corresponds to a the count free service. Further, the "traffic control non-target access destination" is, for example, an access destination that is accessed when a large amount of files are downloaded such as update of an operating system or an application, and an access destination in which the number of accesses or the volume of data communication is small. That is, the "traffic control non-target access destination" is an access destination that causes inconvenience when it is targeted for traffic control or is not very effective even when it is targeted for traffic control. Further, the "traffic control non-target access destination" is, when included in the target of the "transition trend" that will be described later, an access destination that may deteriorate the accuracy of determining whether or not the "traffic control target candidate", which is a "non-management access destination" that should be newly set as a traffic control target, has appeared.

When the access destination of the mobile terminal 20 is a traffic control target access destination held in the management table, the communication apparatus 10 executes the traffic control on the communication between the mobile terminal 20 and the access destination of the mobile terminal 20. This traffic control, which is control for reducing an amount of data communicated between the traffic control target access destination and the access source apparatus, is, for example, pacing processing.

Further, the communication apparatus 10 determines whether or not there has been a change of trend in the communication volume. When it is determined that there has been a change of trend in the communication volume, the communication apparatus 10 specifies (extracts) an access destination that is newly set to be a traffic control target access destination among the plurality of non-management access destinations that correspond to the plurality of respective "non-management access destination sessions". Then the communication apparatus 10 sets the specified access destination to be a new "traffic control target access destination". The "non-management access destination" is an access destination other than the management access destination held in the above management table. Then the "non-management access destination session" is a session whose access destination is the aforementioned non-management access destination.

The server 30 is, for example, an OS (Origin Server/video site). Then the server 30 transmits data (e.g., video data) in accordance with a data transmission request from the mobile terminal 20 received via the communication apparatus 10. This transmission data is transmitted to the mobile terminal 20 via the communication apparatus 10.

The mobile terminal 20 transmits a session establishment request (i.e., an access request) for the server 30 to the communication apparatus 10. After a session has been established between the mobile terminal 20 and the server 30 in accordance with the session establishment request, the mobile terminal 20 transmits a data transmission request via this session. The mobile terminal 20 may be, for example, a mobile telephone including a smartphone, a tablet terminal, a personal computer, or a TV with a network connection function.

<Configuration Example of Communication Apparatus>

Figure 2:
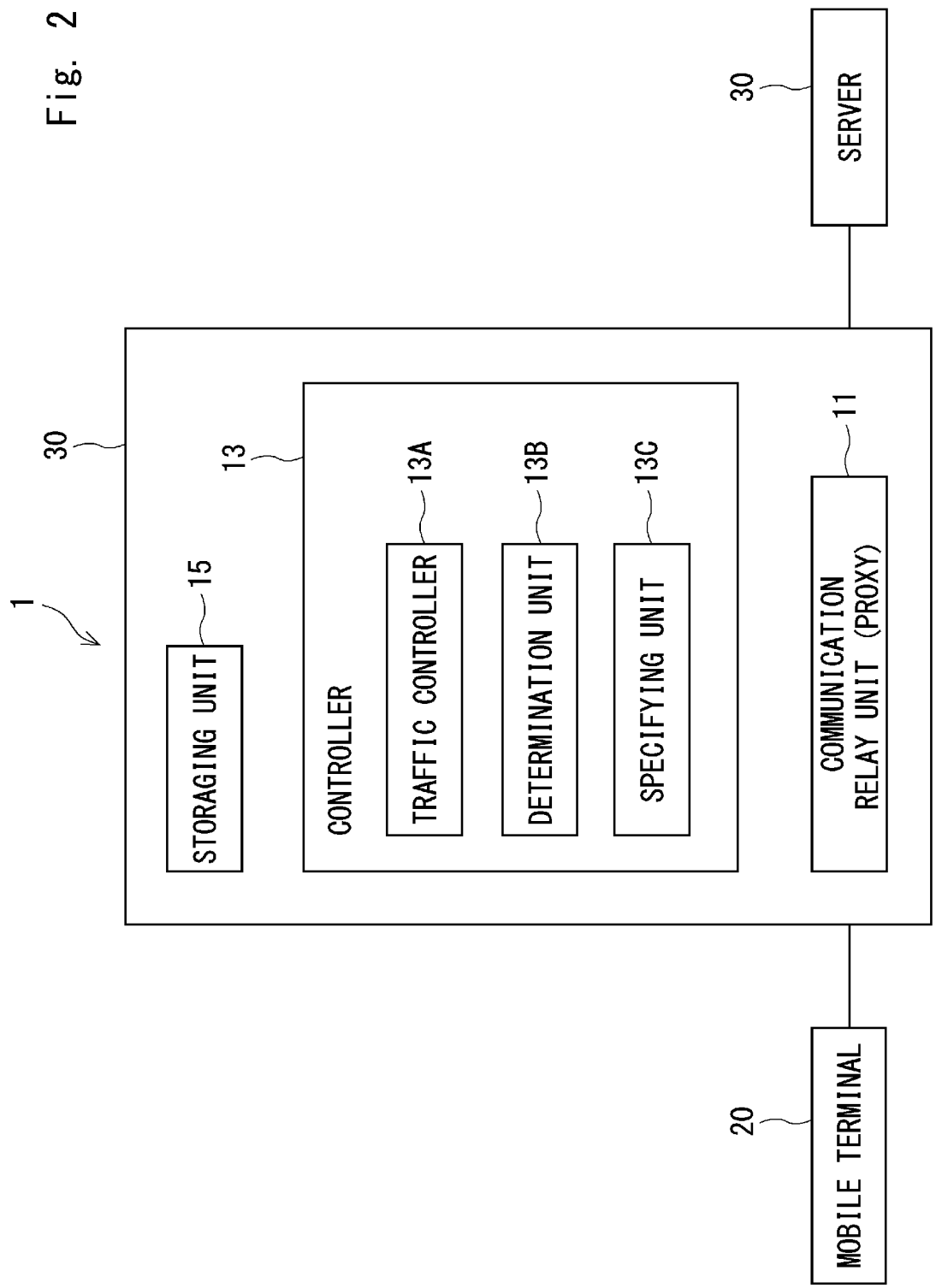
FIG. 2 is a diagram showing one example of a communication apparatus according to the first example embodiment.

FIG. 2 is a diagram showing one example of a communication apparatus according to the first example embodiment. FIG. 2 shows, besides the communication apparatus 10, the mobile terminal 20 and the server 30.

In FIG. 2, the communication apparatus 10 includes a communication relay unit (a proxy) 11, a controller (a control apparatus) 13, and a storing unit 15.

The communication relay unit 11 relays communication between the mobile terminal 20 and the server 30. For example, the communication relay unit 11 serves as a proxy server for the server 30. That is, the communication relay unit 11 serves as a server for the mobile terminal 20 and serves as a client for the server 30.

The storing unit 15 stores (holds) the above "management table".

As shown in FIG. 2, the controller 13 includes a traffic controller 13A, a determination unit 13B, and a specifying unit 13C.

When the access destination of the mobile terminal 20 is a traffic control target access destination held in the management table, the traffic controller 13A executes traffic control on the communication between the mobile terminal 20 and the access destination of the mobile terminal 20. This traffic control, which is control for reducing an amount of data communicated between the traffic control target access destination and the access source apparatus, is, for example, pacing processing.

Specifically, when the access destination of the mobile terminal 20 is a traffic control target access destination held in the management table, the traffic controller 13A causes the communication relay unit 11 to forward data at a transfer speed in accordance with the pacing speed. On the other hand, when the access destination of the mobile terminal 20 is a traffic control non-target access destination held in the management table or a non-management access destination, the traffic controller 13A causes the communication relay unit 11 to collectively forward data.

The determination unit 13B determines whether or not there has been a change in the "trend in the communication volume". This determination is performed based on the communication volume per session of the plurality of "non-management access destination sessions" in a "first unit period" and the "transition trend" of the communication volume per session of the plurality of "non-management access destination sessions" in a "first period". The "non-management access destination" is the access destination of the mobile terminal 20 that has not been stored in the "management table". Further, the "non-management access destination session" is a session whose access destination is the aforementioned non-management access destination. Further, the "first period" is a period that includes a plurality of unit periods prior to the aforementioned first unit period. When, for example, one unit period is set as "one day", the "first unit period" may be a period from the current time to one day before and the "first period" may be a period from one day before to four days before.

When it is determined that there has been a change of trend in the communication volume, the specifying unit 13C specifies the access destination that is newly set as a traffic control target access destination among the plurality of non-management access destinations that correspond to the plurality of respective non-management access destination sessions. This specification is performed based on the increase rates of the communication volumes for the respective non-management access destination sessions in the above "first unit period" and a "second period". The "second period" is a period including a plurality of unit periods prior to the above first unit period. The length of the "second period", which is the number of unit periods included in the "second period", may be the same as or different from the above "first period".

Figure 3:
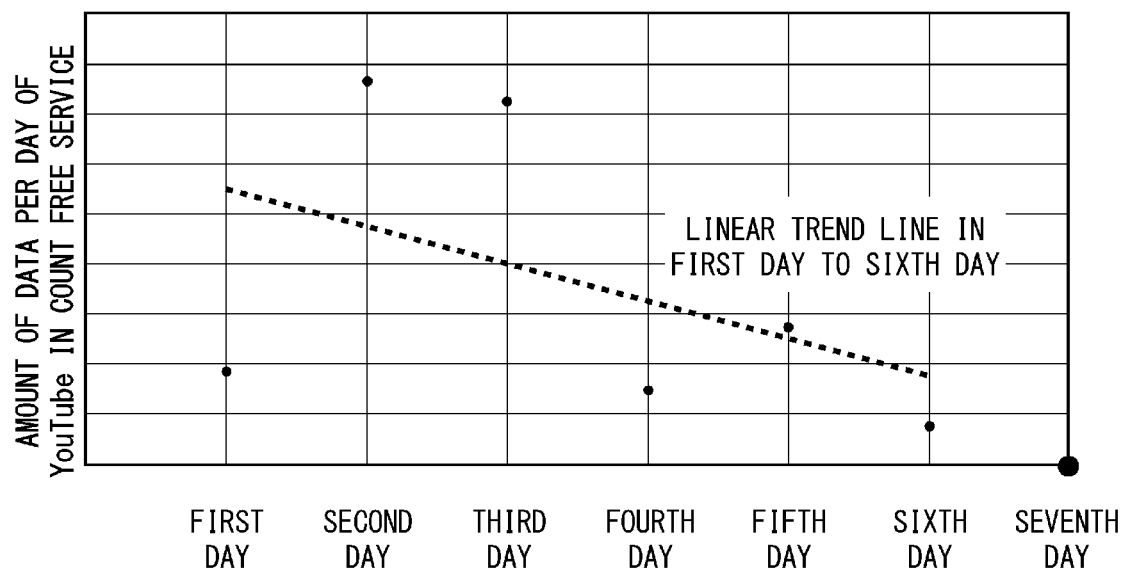
FIG. 3 is a diagram showing transition of an amount of data per day of YouTube (registered trademark) in a count free service.

Now, a comparative example will be described. FIG. 3 is a diagram showing transition of the amount of data per day of YouTube (registered trademark) in the count free service. In this example, YouTube (registered trademark) in the count free service is a "traffic control target access destination". FIG. 3 shows a linear trend line of the communication volume of the "traffic control target access destination" from the first day to the sixth day. Since the communication volume of the "traffic control target access destination" on the seventh day is not on the linear trend line, it can be determined that there has been a change in the trend. That is, it can be determined that there has been a change in the access destination from the "traffic control target access destination" to the "non-management access destination" by the service provider of the count free service. However, in popular video image services such as YouTube (registered trademark), it is possible that the traffic may increase or decrease by more than an expected amount depending on a hot topic that is attracting public attention or a sudden event. Therefore, even when it is determined whether or not there has been a change in the access destination based on the previous trend of the communication volume of the "traffic control target access destination", it is highly likely that the change may not be accurately determined.

On the other hand, in the determination unit 13B of the communication apparatus 10 according to the first example embodiment, the aforementioned determination is made based on the communication volume per session of the plurality of "non-management access destination sessions". That is, the aforementioned determination is made using the session of the non-management access destination in which the above "traffic control target access destination" and "traffic control non-target access destination" are not included. Accordingly, it is possible to rapidly and accurately determine whether or not the "traffic control target candidate", which is a "non-management access destination" that should be newly set as a traffic control target, has appeared. That is, when the above "traffic control target candidate" has appeared, the traffic control has not been executed on the "traffic control target candidate". Therefore, if accesses concentrate on the "traffic control target candidate", it is possible that the communication volume per session may increase. By using this characteristic, it is possible to rapidly and accurately determine whether or not the "traffic control target candidate" has appeared.

When it is determined that there has been a change of trend in the communication volume, the specifying unit 13C of the communication apparatus 10 specifies the access destination that is newly set as a traffic control target access destination among the plurality of non-management access destinations that correspond to the plurality of respective non-management access destination sessions. This specification is performed based on the increase rates of the communication volumes for the respective non-management access destination sessions in the above "first unit period" and "second period". Accordingly, it is possible to accurately specify the access destination that should be newly set as the traffic control target access destination.

Second Example Embodiment

A second example embodiment relates to a more specific example embodiment. Since the basic configuration of a communication system according to the second example embodiment is the same as that of the communication system 1 according to the first example embodiment, the description will be given with reference to FIG. 1.

<Configuration Example of Communication Apparatus>

Figure 4:
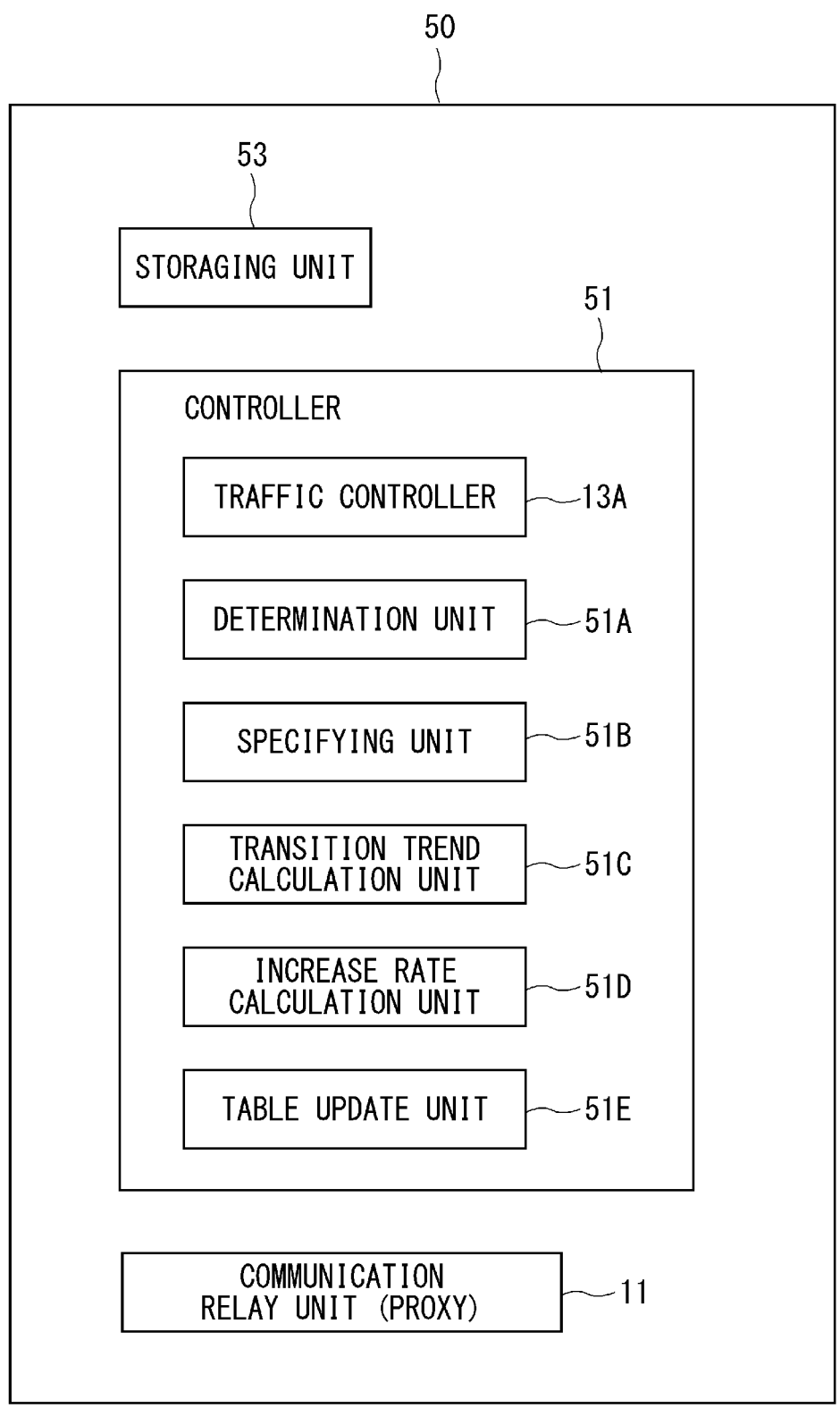
FIG. 4 is a block diagram showing one example of a communication apparatus according to a second example embodiment.

FIG. 4 is a block diagram showing one example of the communication apparatus according to the second example embodiment. A communication apparatus 50 shown in FIG. 4 is included in the communication system 1 shown in FIG. 1, not in the communication apparatus 10.

In FIG. 4, the communication apparatus 50 includes a communication relay unit (a proxy) 11, a controller (a control apparatus) 51, and a storing unit 53.

The storing unit 53 stores (holds) the aforementioned management table, like the storing unit 15 according to the first example embodiment. FIG. 5 is a diagram showing one example of the management table according to the second example embodiment. The management table shown in FIG. 5 includes domains A and B as the "traffic control target access destination" and includes domains X and Y as the "traffic control non-target access destination".

Referring once again to the description of FIG. 4, the storing unit 53 further stores (holds) the "session table". The "session table" stores (holds) the "session information" for each session established by the communication relay unit 11. The "session information" at least includes the access source address of the access source apparatus, information regarding the access destination of the access source apparatus, and the amount of data relayed in the session. FIG. 6 is a diagram showing one example of the session information according to the second example embodiment. In the example shown in FIG. 6, each of the pieces of the session information is a character string in which the transmission source IP address, the transmission destination IP address, the URL (access destination), an amount of transmission data in the session, the session establishment time, the session release time and the like are partitioned by commas. The session information is output from the communication relay unit 11 at the timing when the communication is ended. Then a table update unit 51E, which will be described later, updates the session table using the session information output from the communication relay unit 11.

Referring once again to the description of FIG. 4, the controller 51 includes a traffic controller 13A, a determination unit 51A, a specifying unit 51B, a transition trend calculation unit 51C, an increase rate calculation unit 51D, and a table update unit 51E.

The transition trend calculation unit 51C calculates the communication volume per session of the plurality of non-management access destination sessions in the respective unit periods included in the "first period" using the session information held in the session table. Then the transition trend calculation unit 51C calculates the "transition trend line" in the "first period" using the communication volume per session in the respective unit periods that has been calculated. The "transition trend line" is, for example, an approximation expression that uses the communication volume per session in each of the above unit periods.

The increase rate calculation unit 51D calculates increase rates of the communication volumes of the respective non-management access destination sessions in each of the plurality of "unit period pairs" including two unit periods that are temporally successive in the "first unit period" and the "second period". The calculation of the increase rates will be described later in detail.

The determination unit 51A determines whether or not there has been a change of trend in the communication volume, similar to the determination unit 13B according to the first example embodiment, using the "transition trend line" calculated by the transition trend calculation unit 51C. When, for example, the difference between the value of the communication volume per session in the first unit period and the value that corresponds to the first unit period in the transition trend line is equal to or larger than a predetermined value, the determination unit 51A determines that there has been a change of trend in the communication volume.

The specifying unit 51B specifies the access destination that is newly set as a traffic control target access destination, similar to the specifying unit 13C according to the first example embodiment. Specifically, the specifying unit 51B ranks the non-management access destination sessions in a descending order of the increase rates in each unit period pair based on the increase rates calculated by the increase rate calculation unit 51D. Then the specifying unit 51B specifies (extracts) the access destination that is newly set as the traffic control target access destination based on the result of the ranking. This specification will be described later in detail.

The table update unit 51E adds the access destination specified by the specifying unit 51B to the "management table" as the "traffic control target access destination".

<Operation Example of Communication Apparatus>

One example of the processing operation of the communication apparatus 50 having the aforementioned configuration will be described.

<Session Establishment Processing and Traffic Control Processing>

Figure 7:
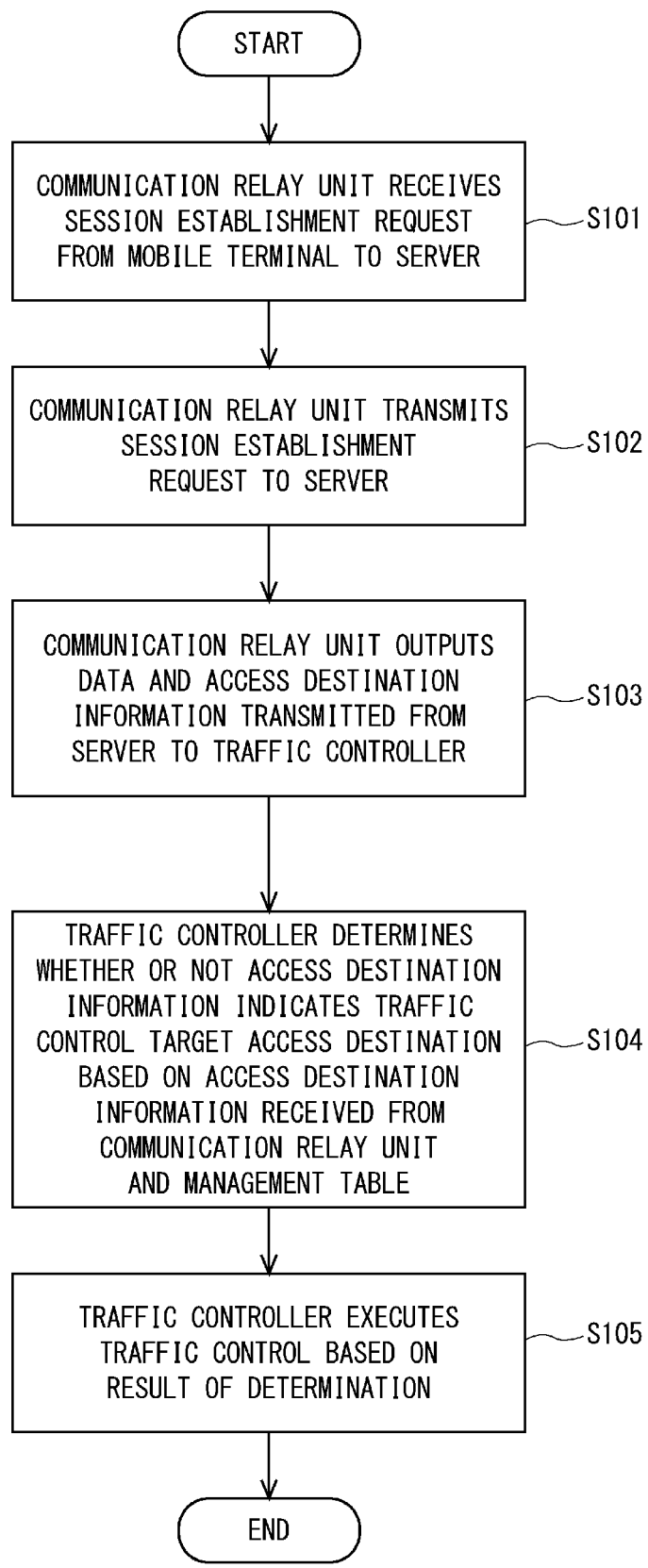
FIG. 7 is a flowchart showing one example of session establishment processing and traffic control processing according to the second example embodiment.

FIG. 7 is a flowchart showing one example of session establishment processing and traffic control processing according to the second example embodiment.

The communication relay unit 11 receives a session establishment request from the mobile terminal 20 to the server 30 (Step S101). Next, the communication relay unit 11 transmits the received session establishment request to the server 30 (Step S102). Accordingly, a session is established between the mobile terminal 20 and the server 30 via the communication relay unit 11.

Next, the communication relay unit 11 receives the data and the access destination information (e.g., information regarding the connection destination domain) transmitted from the server 30 and outputs the received data and information to the traffic controller 13A of the controller 51 (Step S103).

Next, the traffic controller 13A determines whether or not the access destination information indicates the traffic control target access destination based on the access destination information received from the communication relay unit 11 and the management table of the storing unit 53 (Step S104).

Next, the traffic controller 13A executes the traffic control based on the result of the determination in Step S104 (Step S105). That is, when the access destination indicated by the access destination information is the traffic control target access destination held in the management table, the traffic controller 13A causes the communication relay unit 11 to forward data at a transfer speed in accordance with the pacing speed. On the other hand, when the access destination indicated by the access destination information is a traffic control non-target access destination held in the management table or a non-management access destination, the traffic controller 13A causes the communication relay unit 11 to collectively forward data.

The communication relay unit 11 outputs the aforementioned session information at a timing when the communication is ended (that is, when the session is released). Then the table update unit 51E updates the session table using the session information output from the communication relay unit 11.

<Processing of Determining Whether Traffic Control Target Candidate Has Appeared and Processing of Updating Transition Trend>

Figure 8:
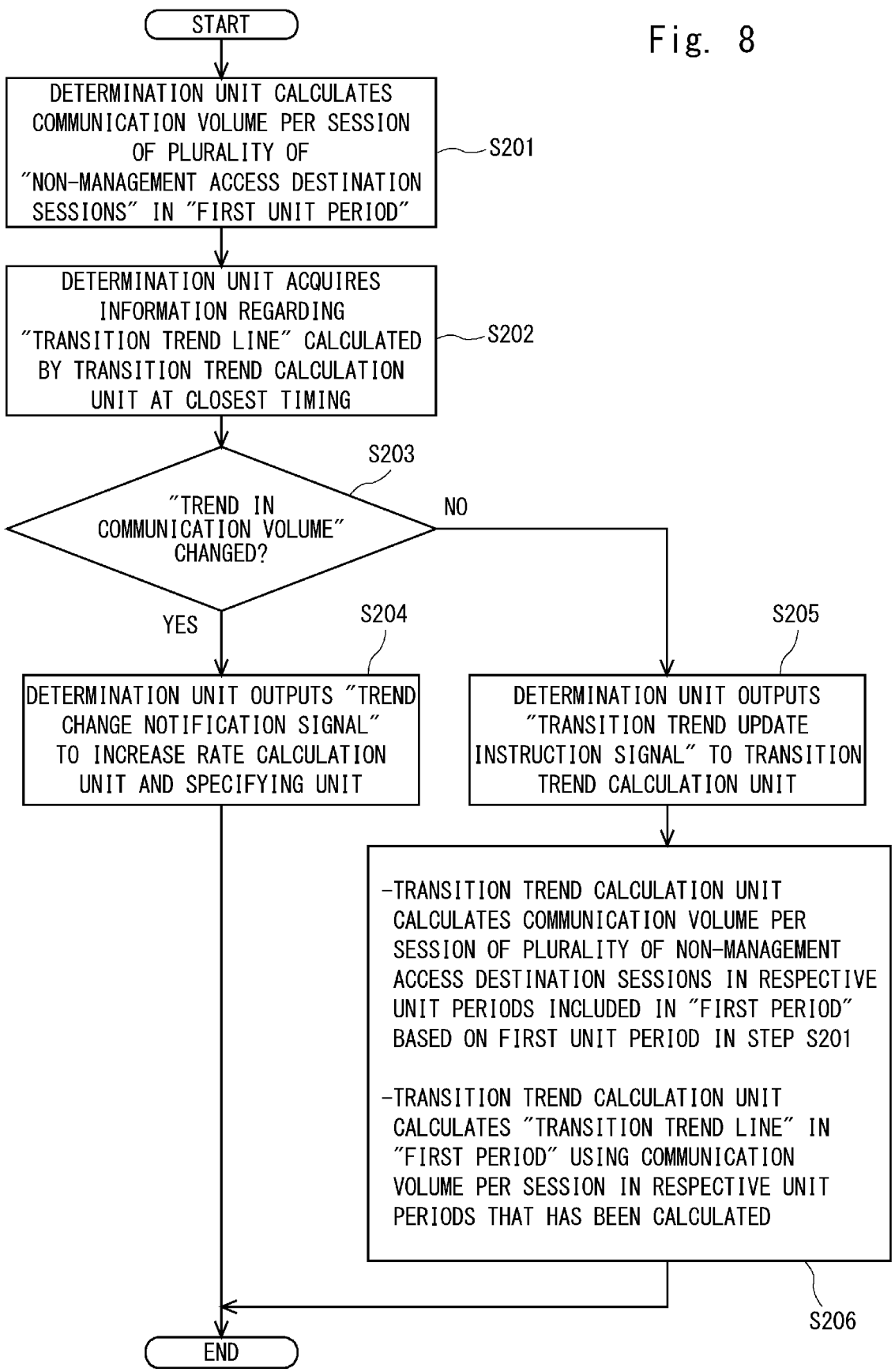
FIG. 8 is a flowchart showing one example of processing of determining whether a traffic control target candidate has appeared and processing of updating a transition trend according to the second example embodiment.

FIG. 8 is a flowchart showing one example of processing of determining whether or not the traffic control target candidate has appeared and processing of updating the transition trend according to the second example embodiment. The flow shown in FIG. 8 starts when the table update unit 51E has updated the session table using the session information.

The determination unit 51A calculates the communication volume per session of the plurality of "non-management access destination sessions" in the "first unit period" (Step S201). As described above, the "first unit period" is, for example, the period from the current time to one day before.

Next, the determination unit 51A acquires information regarding the "transition trend line" calculated by the transition trend calculation unit 51C at the closest timing (Step S202).

Next, the determination unit 51A determines whether or not there has been a change in the "trend in the communication volume" based on the communication volume per session calculated in Step S201 and the information regarding the "transition trend line" acquired in Step S202 (Step S203). That is, the determination unit 51A determines whether or not the communication volume per session calculated in Step S201 has been deviated from the transition trend line. Specifically, when the difference between the value of the communication volume per session in the first unit period and the value that corresponds to the first unit period in the transition trend line is equal to or larger than a predetermined value, the determination unit 51A determines that there has been a change of trend in the communication volume. On the other hand, when the aforementioned difference is smaller than the predetermined value, the determination unit 51A determines that there has been no change of trend in the communication volume.

When it is determined that there is a change of trend in the communication volume (Step S203: YES), the determination unit 51A outputs a "trend change notification signal" to the increase rate calculation unit 51D and the specifying unit 51B (Step S204).

When it is determined that there is no change of trend in the communication volume (Step S203: NO), the determination unit 51A outputs a "transition trend update instruction signal" to the transition trend calculation unit 51C (Step S205).

Next, the transition trend calculation unit 51C calculates the communication volume per session of the plurality of non-management access destination sessions in the respective unit periods included in the "first period" based on the first unit period in Step S201 (Step S206). Then the transition trend calculation unit 51C calculates the "transition trend line" in the "first period" using the communication volume per session in the respective unit periods that has been calculated (Step S206). As described above, the "transition trend line" is, for example, an approximation expression that uses the communication volume per session in each unit period that has been calculated. The information regarding the "transition trend line" calculated as described above is, for example, held in a memory (not shown) in the transition trend calculation unit 51C and is acquired in Step S202 when the flow shown in FIG. 8 is started next.

<Processing of Specifying New Traffic Control Target Access Destination and Processing of Updating Management Table>

Figure 9:
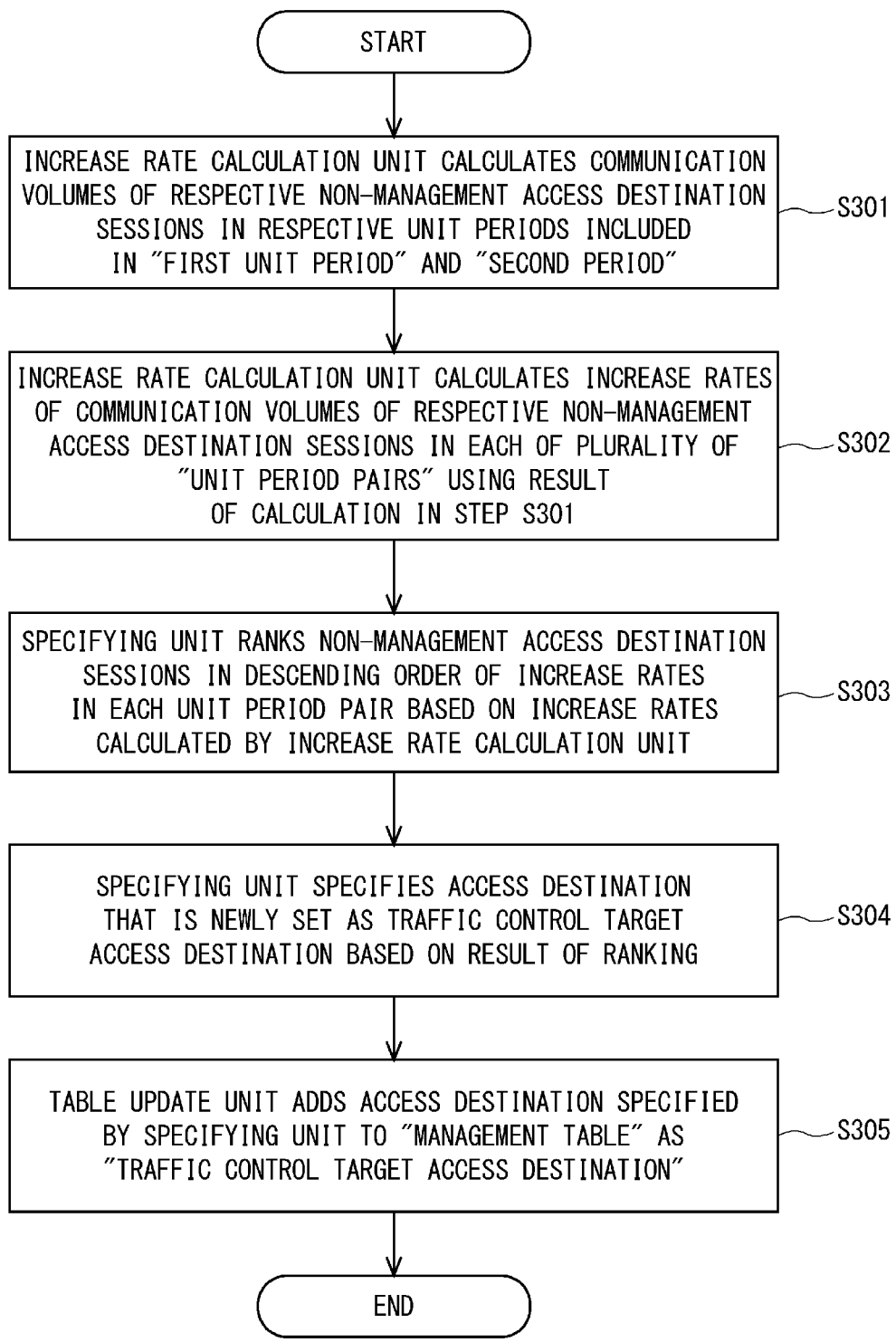
FIG. 9 is a flowchart showing one example of processing of specifying a new traffic control target access destination according to the second example embodiment.

FIG. 9 is a flowchart showing one example of processing of specifying the new traffic control target access destination according to the second example embodiment. The flow shown in FIG. 9 is started when the increase rate calculation unit 51D and the specifying unit 51B receive the above "trend change notification signal".

The increase rate calculation unit 51D calculates the communication volumes of the respective non-management access destination sessions in the respective unit periods included in the "first unit period" and the "second period" (Step S301).

Next, the increase rate calculation unit 51D calculates the increase rates of the communication volumes of the respective non-management access destination sessions in each of the plurality of "unit period pairs" using the result of the calculation in Step S301 (Step S302). The plurality of "unit period pairs" include two unit periods that are temporally successive in the "first unit period" and the "second period". It is assumed here that the "first unit period" is a period from the current time to one day before and the "first period" is a period from one day before to four days before. In this case, the increase rate between four days before and three days before, the increase rate between three days before and two days before, the increase rate between two days before and one day before, and the increase rate between one day before and the current day (including the current time) are calculated. In the following description, the increase rate between four days before and three days before, the increase rate between three days before and two days before, the increase rate between two days before and one day before, and the increase rate between one day before and the current day (including the current time) are referred to as a "first increase rate", a "second increase rate", a "third increase rate", and a "fourth increase rate".

Next, the specifying unit 51B ranks the non-management access destination sessions in a descending order of the increase rates in each unit period pair based on the increase rates calculated by the increase rate calculation unit 51D (Step S303). FIG. 10 is a diagram showing one example of a ranking table in which the non-management access destinations are ranked. In FIG. 10, the increase rate of the non-management access destination which is ranked first is the highest. In FIG. 10, the description of the non-management access destinations which are ranked sixth is omitted.

Next, the specifying unit 51B specifies the access destination that is newly set as the traffic control target access destination based on the result of the ranking (Step S304). For example, the specifying unit 51B may regard the non-management access destinations ranked within the top five destinations as high-order destinations and specify the non-management access destination ranked higher for four consecutive days to be the access destination that is newly set as a traffic control target access destination. In the example shown in FIG. 10, in all the "first increase rate", the "second increase rate", the "third increase rate", and the "fourth increase rate", the domain C is ranked within the top five destinations. Therefore, the domain C is specified as the access destination that is newly set as the traffic control target access destination.

Next, the table update unit 51E adds the access destination specified by the specifying unit 51B to the "management table" as the "traffic control target access destination" (Step S305).

As described above, according to the second example embodiment, the transition trend calculation unit 51C of the communication apparatus 50 calculates the communication volume per session of the plurality of non-management access destination sessions in the respective unit periods included in the "first period". Then the transition trend calculation unit 51C calculates the "transition trend line" in the "first period" using the communication volume per session in the respective unit periods that has been calculated.

With the configuration of the communication apparatus 50 described above, unlike the aforementioned comparative example, the transition trend line can be calculated using the communication volume per session of the non-management access destination session. It is therefore possible to calculate the "transition trend line" which is not affected by special circumstances such as a trend in the "traffic control target access destination". Then by using this "transition trend line", it is possible to rapidly and accurately determine whether or not the "traffic control target candidate", which is a "non-management access destination" that should be newly set as a traffic control target, has appeared.

Further, when the difference between the value of the communication volume per session in the first unit period and the value that corresponds to the first unit period in the "transition trend line" is equal to or larger than a predetermined value, the determination unit 51A of the communication apparatus 50 determines that there has been a change in the "trend in the communication volume".

According to the configuration of the communication apparatus 50, it is possible to prevent a determination that there has been a change in the "trend in the communication volume" due to the fluctuation of the communication volume of the unit period normally generated.

Further, the specifying unit 51B of the communication apparatus 50 ranks the non-management access destination sessions in a descending order of the increase rates in each unit period pair based on the increase rates calculated by the increase rate calculation unit 51D. Then the specifying unit 51B specifies (extracts) the access destination that is newly set as the traffic control target access destination based on the result of the ranking.

With the configuration of this communication apparatus 50, it is possible to accurately specify the access destination that should be newly set as the traffic control target access destination.

Other Example Embodiments

Figure 11:
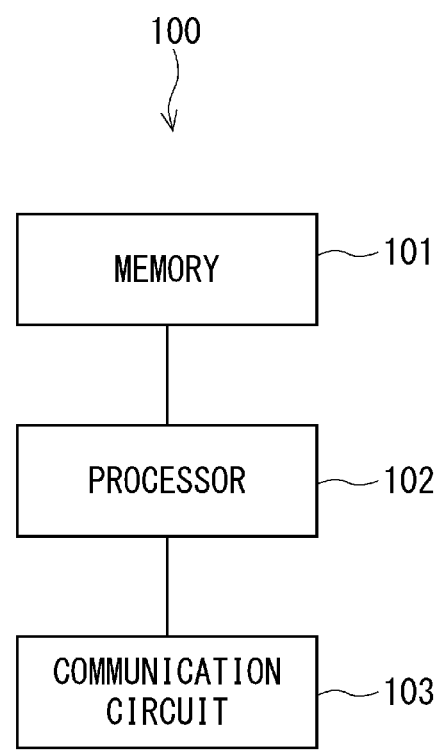
FIG. 11 is a diagram showing a hardware configuration example of the communication apparatus.

FIG. 11 is a diagram showing a hardware configuration example of a communication apparatus. In FIG. 11, a communication apparatus 100 includes a processor 101, a memory 102, and a communication circuit 103. The controllers (control apparatuses) 13 and 51 of the communication apparatuses 10 and 50 may be implemented by the processor 101 loading a program stored in the memory 102 and executing the loaded program. Further, the storing units 15 and 53 may be implemented by the memory 102. Further, the communication relay unit 11 may be implemented by the communication circuit 103. The program can be stored using various types of non-transitory computer readable media and can be supplied to the communication apparatus 100. Further, the program may be supplied to the communication apparatus 100 by various types of transitory computer readable media.

While the present disclosure has been described with reference to the embodiments, the present disclosure is not limited to the aforementioned example embodiments. Various changes that can be understood by those skilled in the art can be made to the configurations and the details of the present disclosure within the scope of the present disclosure.

A part or all of the aforementioned embodiments may be described as shown in the following Supplementary Notes. However, they are not limited thereto.

(Supplementary Note 1)

A communication apparatus comprising:

a storing unit configured to store a management table that holds a plurality of management access destinations including at least one traffic control target access destination and at least one traffic control non-target access destination;

a communication relay unit configured to establish a session between an access source apparatus and an access destination of the access source apparatus and relay communication between the access source apparatus and the access destination;

a traffic controller configured to execute traffic control on the communication between the access source apparatus and the access destination of the access source apparatus when the access destination of the access source apparatus is the traffic control target access destination held in the management table;

a determination unit configured to determine whether or not there has been a change of trend in the communication volume based on a communication volume per session of a plurality of non-management access destination sessions established by the communication relay means in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table; and a specifying unit configured to specify, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period.

(Supplementary Note 2)

The communication apparatus according to Supplementary Note 1, wherein the storing unit further stores a session table that holds, for each of sessions established by the communication relay means, session information including at least an access source address of the access source apparatus, information regarding the access destination of the access source apparatus, and an amount of data relayed in the session, and the communication apparatus further comprises a transition trend calculation unit configured to calculate the communication volume per session of the plurality of non-management access destination sessions in the respective unit periods included in the first period using the session information held in the session table, and calculate a transition trend line in the first period using the communication volume per session in the respective unit periods that has been calculated.

(Supplementary Note 3)

The communication apparatus according to Supplementary Note 2, wherein, when a difference between the value of the communication volume per session in the first unit period and a value that corresponds to the first unit period in the transition trend line that has been calculated is equal to or larger than a predetermined value, the determination unit determines that there has been a change of trend in the communication volume.

(Supplementary Note 4)

The communication apparatus according to any one of Supplementary Notes 1 to 3, further comprising:

an increase rate calculation unit configured to calculate increase rates of the communication volumes of the respective non-management access destination sessions in each of a plurality of unit period pairs including two unit periods that are temporally successive in the first unit period and the second period, wherein the specifying unit ranks, based on the increase rates calculated by the increase rate calculation unit, non-management access destination sessions in a descending order of the increase rates in each unit period pair, and specifies the access destination that is newly set as the traffic control target access destination based on the result of the ranking.

(Supplementary Note 5)

The communication apparatus according to Supplementary Note 4, wherein the specifying unit specifies non-management access destination sessions whose orders of increase rates are within a predetermined order from the one with the highest increase rate in all the plurality of unit period pairs to be the access destinations that are newly set as the traffic control target access destination.

(Supplementary Note 6)

The communication apparatus according to any one of Supplementary Notes 1 to 5, further comprising a table update unit configured to add the access destination that has been specified to the management table as the traffic control target access destination.

(Supplementary Note 7)

A traffic control method comprising:

establishing a session between an access source apparatus and an access destination of the access source apparatus to relay communication between the access source apparatus and the access destination, and executing, when the access destination of the access source apparatus is a traffic control target access destination held in a management table, traffic control on the communication between the access source apparatus and the access destination of the access source apparatus, the management table holding a plurality of management access destinations including at least one traffic control target access destination and at least one traffic control non-target access destination;

determining whether or not there has been a change of trend in the communication volume based on a communication volume per session of a plurality of non-management access destination sessions established in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table; and specifying, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period.

(Supplementary Note 8)

A control program for causing a communication apparatus to execute processing of:

establishing a session between an access source apparatus and an access destination of the access source apparatus to relay communication between the access source apparatus and the access destination, and executing, when the access destination of the access source apparatus is a traffic control target access destination held in a management table, traffic control on the communication between the access source apparatus and the access destination of the access source apparatus, the management table holding a plurality of management access destinations including at least one traffic control target access destination and at least one traffic control non-target access destination;

determining whether or not there has been a change of trend in the communication volume based on a communication volume per session of a plurality of non-management access destination sessions established in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table; and specifying, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period.

(Supplementary Note 9)

A control apparatus configured to control a communication apparatus including a communication relay unit configured to establish a session between an access source apparatus and an access destination of the access source apparatus and relay communication between the access source apparatus and the access destination, the control apparatus comprising:

a traffic controller configured to execute, when the access destination of the access source apparatus is the traffic control target access destination held in a management table that holds a plurality of management access destinations including at least one traffic control target access destination and at least one traffic control non-target access destination, traffic control on the communication between the access source apparatus and the access destination of the access source apparatus;

a determination unit configured to determine whether or not there has been a change of trend in the communication volume based on a communication volume per session of a plurality of non-management access destination sessions established by the communication relay means in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table; and a specifying unit configured to specify, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period.

(Supplementary Note 10)

The control apparatus according to Supplementary Note 9, further comprising a transition trend calculation unit configured to calculate the communication volume per session of the plurality of non-management access destination sessions in the respective unit periods included in the first period using session information held in a session table that holds, for each of sessions established by the communication relay means, session information including at least an access source address of the access source apparatus, information regarding the access destination of the access source apparatus, and an amount of data relayed in the session, and calculate a transition trend line in the first period using the communication volume per session in the respective unit periods that has been calculated.

(Supplementary Note 11)

The control apparatus according to Supplementary Note 10, wherein, when a difference between the value of the communication volume per session in the first unit period and a value that corresponds to the first unit period in the transition trend line that has been calculated is equal to or larger than a predetermined value, the determination unit determines that there has been a change of trend in the communication volume.

(Supplementary Note 12)

The control apparatus according to any one of Supplementary Notes 9 to 11, further comprising:

an increase rate calculation unit configured to calculate increase rates of the communication volumes of the respective non-management access destination sessions in each of a plurality of unit period pairs including two unit periods that are temporally successive in the first unit period and the second period, wherein the specifying unit ranks, based on the increase rates calculated by the increase rate calculation unit, non-management access destination sessions in a descending order of the increase rates in each unit period pair, and specifies the access destination that is newly set as the traffic control target access destination based on the result of the ranking.

(Supplementary Note 13)

The control apparatus according to Supplementary Note 12, wherein the specifying unit specifies non-management access destination sessions whose orders of increase rates are within a predetermined order from the one with the highest increase rate in all the plurality of unit period pairs to be the access destinations that are newly set as the traffic control target access destination.

(Supplementary Note 14)

The control apparatus according to any one of Supplementary Notes 9 to 13, further comprising a table update unit configured to add the access destination that has been specified to the management table as the traffic control target access destination.

This application is based upon and claims the benefit of priority from Japanese Patent Application No. 2018-006442, filed on Jan. 18, 2018, the disclosure of which is incorporated herein in its entirety by reference.

REFERENCE SIGNS LIST

1 Communication System
10, 50 Communication Apparatus
11 Communication Relay Unit
13, 51 Controller
13A Traffic Controller
13B, 51A Determination Unit
13C, 51B Specifying Unit
15, 53 Storing Unit
20 Mobile Terminal
30 Server
51C Transition Trend Calculation Unit
51D Increase Rate Calculation Unit
51E Table Update Unit

What is claimed is:

1. A communication apparatus comprising:
at least one memory storing instructions and a management table that holds a plurality of management access destinations including at least one traffic control target access destination and at least one traffic control non-target access destination;
at least one transceiver configured to establish a session between an access source apparatus and an access destination of the access source apparatus and relaying communication between the access source apparatus and the access destination; and
at least one processor configured to execute the instructions to:
execute traffic control on the communication between the access source apparatus and the access destination of the access source apparatus when the access destination of the access source apparatus is the traffic control target access destination held in the management table;
determine whether or not there has been a change of trend in the communication volume based on a communication volume per session of a plurality of non-management access destination sessions established by the communication relay means in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table;
specify, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period; and
calculate an increase rate of the communication volume of each of the non-management access destination sessions in each of a plurality of unit period pairs including two unit periods that are temporally successive in the first unit period and the second period,
wherein the specifying includes ranking, based on the increase rates calculated, non-management access destination sessions in a descending order of the increase rates in each unit period pair, and specifying the access destination that is newly set as the traffic control target access destination based on the result of the ranking.

2. The communication apparatus according to claim 1, wherein
the at least one memory further stores a session table that holds, for each of sessions established by the communication relay means, session information including at least an access source address of the access source apparatus, information regarding the access destination of the access source apparatus, and an amount of data relayed in the session, and
the at least one processor configured to execute the instructions to calculate the communication volume per session of the plurality of non-management access destination sessions in the respective unit periods included in the first period using the session information held in the session table, and calculate a transition trend line in the first period using the communication volume per session in the respective unit periods that has been calculated.

3. The communication apparatus according to claim 2, wherein, when a difference between the value of the communication volume per session in the first unit period and a value that corresponds to the first unit period in the transition trend line that has been calculated is equal to or larger than a predetermined value, the at least one processor configured to execute the instructions to determine that there has been a change of trend in the communication volume.

4. The communication apparatus according to claim 1, wherein the specifying includes specifying non-management access destination sessions whose orders of increase rates are within a predetermined order from the one with the highest increase rate in all the plurality of unit period pairs to be the access destinations that are newly set as the traffic control target access destination.

5. The communication apparatus according to claim 1, wherein the at least one processor configured to execute the instructions to add the access destination that has been specified to the management table as the traffic control target access destination.

6. A traffic control method comprising:
establishing a session between an access source apparatus and an access destination of the access source apparatus to relay communication between the access source apparatus and the access destination, and executing, when the access destination of the access source apparatus is a traffic control target access destination held in a management table, traffic control on the communication between the access source apparatus and the access destination of the access source apparatus, the management table holding a plurality of management access destinations including at least one traffic control target access destination and at least one traffic control non-target access destination,
determining whether or not there has been a change of trend in the communication volume based on a communication volume per session of a plurality of non-management access destination sessions established in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table;

specifying, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period; and calculating an increase rate of the communication volume of each of the non-management access destination sessions in each of a plurality of unit period pairs including two unit periods that are temporally successive in the first unit period and the second period, wherein the specifying includes ranking, based on the increase rates calculated, non-management access destination sessions in a descending order of the increase rates in each unit period pair, and specifying the access destination that is newly set as the traffic control target access destination based on the result of the ranking.

7. A control apparatus configured to control a communication apparatus including at least one transceiver configured to establish a session between an access source apparatus and an access destination of the access source apparatus and relaying communication between the access source apparatus and the access destination, the control apparatus comprising:

at least one memory storing instructions; and
at least one processor configured to execute the instructions to:
execute, when the access destination of the access source apparatus is the traffic control target access destination held in a management table that holds a plurality of management access destinations including at least one traffic control target access destination and at least one traffic control non-target access destination, traffic control on the communication between the access source apparatus and the access destination of the access source apparatus;
determine whether or not there has been a change of trend in the communication volume based on a communication volume per session of a plurality of non-management access destination sessions established by the communication relay means in a first unit period and a transition trend of communication volume per session of a plurality of non-management access destination sessions in a first period including a plurality of unit periods prior to the first unit period, each of the non-management access destination sessions being a session whose access destination is a non-management access destination that is not held in the management table;

specify, when it is determined that there has been a change of trend in the communication volume, the access destination that is newly set as a traffic control target access destination among a plurality of non-management access destinations that correspond to the plurality of respective non-management access destination sessions based on increase rates of the communication volumes for the respective non-management access destination sessions in the first unit period and a second period including a plurality of unit periods prior to the first unit period; and calculate an increase rate of the communication volume of each of the non-management access destination sessions in each of a plurality of unit period pairs including two unit periods that are temporally successive in the first unit period and the second period, wherein the specifying includes ranking, based on the increase rates calculated, non-management access destination sessions in a descending order of the increase rates in each unit period pair, and specifying the access destination that is newly set as the traffic control target access destination based on the result of the ranking.

8. The control apparatus according to claim 7, wherein the at least one processor configured to execute the instructions to calculate the communication volume per session of the plurality of non-management access destination sessions in the respective unit periods included in the first period using session information held in a session table that holds, for each of sessions established by the communication relay means, session information including at least an access source address of the access source apparatus, information regarding the access destination of the access source apparatus, and an amount of data relayed in the session, and calculate a transition trend line in the first period using the communication volume per session in the respective unit periods that has been calculated.

9. The control apparatus according to claim 8, wherein, when a difference between the value of the communication volume per session in the first unit period and a value that corresponds to the first unit period in the transition trend line that has been calculated is equal to or larger than a predetermined value, the at least one processor configured to execute the instructions to determine that there has been a change of trend in the communication volume.

10. The control apparatus according to claim 7, wherein the specifying includes specifying non-management access destination sessions whose orders of increase rates are within a predetermined order from the one with the highest increase rate in all the plurality of unit period pairs to be the access destinations that are newly set as the traffic control target access destination.

11. The control apparatus according to claim 7, wherein the at least one processor configured to execute the instructions to add the access destination that has been specified to the management table as the traffic control target access destination.

* * * * *